United States Patent
Berg

(10) Patent No.: US 6,371,457 B1
(45) Date of Patent: *Apr. 16, 2002

(54) PNEUMATIC SPRING WITH A HOSE ROLLING BELLOWS

(75) Inventor: Jürgen Berg, Barsbüttel (DE)

(73) Assignee: Phoenix Aktiengesellschaft, Hamburg (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/202,390
(22) PCT Filed: Sep. 18, 1997
(86) PCT No.: PCT/DE97/02100
§ 371 Date: Dec. 11, 1998
§ 102(e) Date: Dec. 11, 1998
(87) PCT Pub. No.: WO98/14717
PCT Pub. Date: Apr. 9, 1998

(30) Foreign Application Priority Data

Sep. 30, 1996 (DE) .......................................... 196 40 056

(51) Int. Cl.[7] ................. F16F 9/04; F16F 9/05
(52) U.S. Cl. .................. 267/64.24; 267/122; 267/64.19
(58) Field of Search ............................ 267/122, 64.19, 267/64.21, 64.23, 64.24, 64.27

(56) References Cited

U.S. PATENT DOCUMENTS

| 3,130,965 A | | 4/1964 | Niclas |
| 3,351,337 A | | 11/1967 | Nishioka et al. |
| 5,080,328 A | * | 1/1992 | Pees ..................... 267/64.24 |

FOREIGN PATENT DOCUMENTS

| DE | 1 152 316 | 8/1963 |
| DE | 2 117 259 | 10/1971 |
| DE | 36 43 073 A1 | 6/1988 |
| DE | 41 18 576 A1 | 12/1992 |
| DE | 41 18 577 A1 | 12/1992 |

* cited by examiner

Primary Examiner—Matthew C. Graham
(74) Attorney, Agent, or Firm—Collard & Roe, P.C.

(57) ABSTRACT

This invention concerns a pneumatic spring consisting of a hose roll bellows of elastomer material which is equipped, in particular, with stiffening supports. The ends of the hose roll bellows are pushed onto a connecting element and attached there by a radially ductile clamping ring particularly made out of metal. According to the invention, the connecting element and/or clamping ring are made thicker with a covering elastomer strip in the area of clamping. The elastomer strip is a component which is separate from the hose roll bellows. Several variants are presented.

9 Claims, 1 Drawing Sheet

PNEUMATIC SPRING WITH A HOSE ROLLING BELLOWS

BACKGROUND OF THE INVENTION

1. Field of the Invention

The invention relates to a pneumatic spring comprising a hose roll bellows (pneumatic spring bellows) made of elastomer material, which in particular is provided with stiffening supports, whereby the ends of the hose roll bellows are pushed onto a connecting element and are secured there by means of a radially deformable clamping ring, which in particular is made of metal (DE-A-36 43 073).

2. Description of the Related Art Including Information Disclosed Under 37 C.F.R. 1.97 and 1.98.

In laid-open document DE-A-21 17 259, the pneumatic spring bellows is made thicker at the outer ends. Conical connecting elements are expected to make the attachment even more secure under tensile stress. The drawback of said design is the increased expenditure in the manufacture of such pneumatic spring bellows. A further drawback is that due to the conical clamping, the pneumatic spring bellows changes its position under tensile load, which means that the constructional position of the bellows is shifted as well.

Laid-open document DE-B-11 52 316 describes a pneumatic spring bellows with core rings incorporated by vulcanization. The pneumatic spring bellows is mounted here on or in conical cylinders and additionally secured by a supporting ring and a bead. The drawback of this solution lies in the high expenditure for the manufacture and for mounting the bellows with fastening means disposed in a pot.

A particularly critical point in pneumatic springs is the region where the connecting element, the hose roll bellows and the clamping ring are joined, especially under the aspects of

- influence of material variations;
- influence of the manufactured diameter of the pneumatic spring bellows in relation to the clamp-on diameter of the connecting component;
- application of the pneumatic spring at different temperatures in association with different types of material employed for the connecting component, the hose roll bellows and the clamping ring; as well as
- total thickness of the hose roll bellows in relation to the stiffening support, whereby the share of the elastomer is reduced or reduced even further due to inherent friction.

Now, within the framework of a further development the problem is to improve the tightness of the hose roll bellows in the region of the clamping ring.

BRIEF SUMMARY OF THE INVENTION

Said problem is solved in that the connecting component and/or the clamping ring are made thicker within the clamping region with an elastomer strip, whereby the elastomer strip is a separate structural element with respect to the hose roll bellows. The term "separate structural element" means in this connection that conditioned by the manufacture, the elastomer strip is a structural element separated from the pneumatic spring bellows, namely as opposed to the embodiments according to DE-A-21 17 259 and DE-B-11 52 316.

The following variations are usefully employed in this connection:

(A) The clamping ring has an elastomer strip applied to it by vulcanizing or gluing, said strip facing the hose roll bellows.

(B) An elastomer strip is present between the hose roll bellows and the connecting element, said elastomer strip being installed in a groove of the connecting element, whereby the elastomer strip may be joined with the connecting element by gluing.

(C) The clamping ring has an elastomer strip, which is gripping around the clamping ring by means of a collar and which faces the hose roll bellows. In addition, the elastomer strip may be glued to the clamping ring.

(D) The elastomer strip is designed in the form of a U-section and encloses the end of the hose roll bellows, which comprises a thickening on both sides.

Irrespective of which of said variations is involved it is advantageous if the thickness of the elastomer strip amounts to 30% to 150%, particularly to 40% to 90% of the normal thickness of the bellows, namely based on the unstressed condition.

The invention is now explained with the help of exemplified embodiments with reference to schematic drawings in which:

Figure 1:
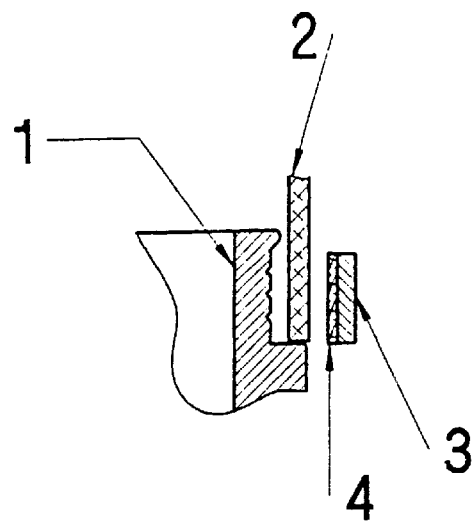
FIG. 1 shows a pneumatic spring according to variation A.

The following list of reference numerals applies in connection with said figures:

1 Connecting element with groove
2 Hose roll bellows
3 Clamping ring
4 Elastomer strip
4' Elastomer strip
4" Elastomer strip with collar
4''' Elastomer strip as a U-section.

DETAILED DESCRIPTION OF THE INVENTION

According to FIG. 1, clamping ring 3 has an elastomer strip 4 applied to it by vulcanizing or gluing, said elastomer strip facing the hose roll bellows 2.

Figure 2:
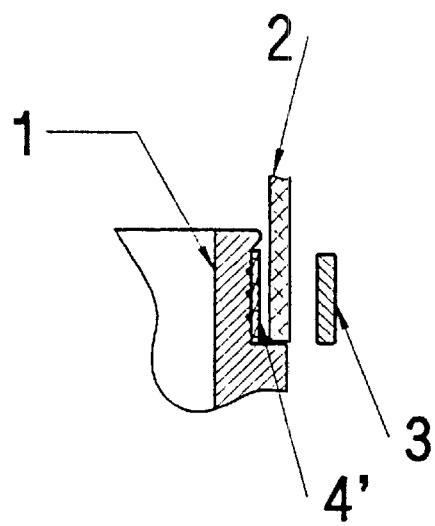
FIG. 2 shows a pneumatic spring according to variation B.

According to FIG. 2, an elastomer strip 4' is present between the hose roll bellows 2 and the connecting element 1, said elastomer strip sitting in a groove of the connecting element.

Figure 3:
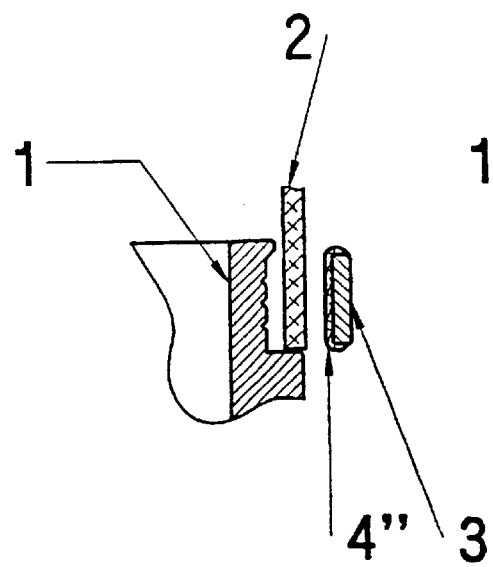
FIG. 3 shows a pneumatic spring according to variation C.

According to FIG. 3, clamping ring 3 has an elastomer strip 4", which grips around clamping ring 3 by means of a collar and faces the hose roll bellows 2. The advantage of this variation is that the elastomer strip 4", can be manufactured as a separate structural element.

Figure 4:
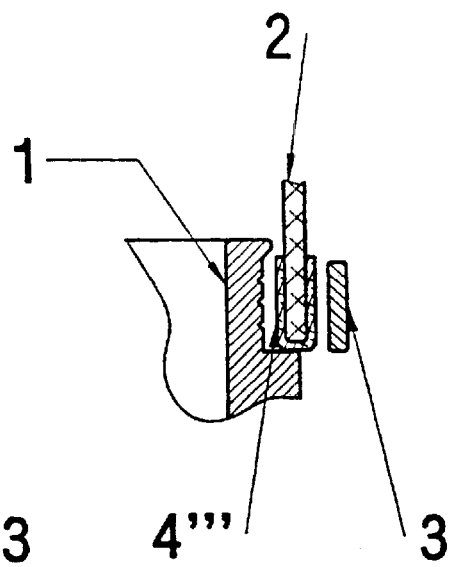
FIG. 4 shows a pneumatic spring according to variation D.

According to FIG. 4, the elastomer strip 4''' is designed as a U-section and encloses the end of hose roll bellows 2, which is connected with a thickening on both sides.

What is claimed is:

1. A pneumatic spring coupled in a sealed relationship with a connecting element, the spring comprising:
   a) a hose roll bellows having ends, and formed from an elastomer material which contains a series of stiffening supports;
   b) a radially deformable metal clamping ring for securing said hose roll bellows to the connecting element; and c) substantially solid elastomer strip disposed in a clamping region of the spring between said clamping ring and the connecting element wherein when said clamping ring is tightened, it secures said elastomer strip, and said hose roll bellows to the connecting element wherein said elastomer strip is a separate structural element from said hose roll bellows and adds a thickness to the spring in said clamping region.

2. The pneumatic spring according to claim 1, wherein said elastomer strip is attached to said clamping ring by vulcanizing or gluing wherein said elastomer strip faces said hose roll bellows.

3. The pneumatic spring according to claim 1, wherein the connecting element further comprises a groove and said elastomer strip is attached to the connecting element in said groove.

4. The pneumatic spring according to claim 3, wherein said elastomer strip is attached to the connecting element by gluing.

5. The pneumatic spring according to claim 1, wherein said elastomer strip is attached around said clamping ring as a collar and faces said hose roll bellows.

6. The pneumatic spring according to claim 5, wherein said elastomer strip is glued to said clamping ring.

7. The pneumatic spring according to claim 1, wherein said elastomer strip is attached to said hose roll bellows and is designed as a U-section enclosing said end of said hose roll bellows.

8. The pneumatic spring according to claim 1, wherein said elastomer strip has a thickness between 30% and 150% of the normal bellows thickness in the unstressed condition.

9. The pneumatic spring according to claim 8, wherein the thickness of the elastomer strip in the region of the clamping ring is between 40% and 90% of the normal bellows thickness, in the unstressed condition.

* * * * *